United States Patent
Maples et al.

(10) Patent No.: US 9,733,370 B2
(45) Date of Patent: Aug. 15, 2017

(54) DUAL AXIS GEOPHONES FOR PRESSURE/VELOCITY SENSING STREAMERS FORMING A TRIPLE COMPONENT STREAMER

(71) Applicant: SERCEL, INC., Houston, TX (US)

(72) Inventors: Mike Maples, Houston, TX (US); John S. Hepp, Leander, TX (US)

(73) Assignee: SERCEL, INC., Houston, TX (US)

( * ) Notice: Subject to any disclaimer, the term of this patent is extended or adjusted under 35 U.S.C. 154(b) by 712 days.

(21) Appl. No.: 13/664,708

(22) Filed: Oct. 31, 2012

(65) Prior Publication Data

US 2013/0064038 A1     Mar. 14, 2013

Related U.S. Application Data (63) Continuation of application No. 13/493,361, filed on Jun. 11, 2012, which is a continuation of application No. 13/161,896, filed on Jun. 16, 2011.

(60) Provisional application No. 61/356,835, filed on Jun. 21, 2010.

(51) Int. Cl.
*G01V 1/38* (2006.01)
*G01V 1/18* (2006.01)

(52) U.S. Cl.
CPC ............ *G01V 1/184* (2013.01); *G01V 1/186* (2013.01); *G01V 1/189* (2013.01); *G01V 1/38* (2013.01)

(58) Field of Classification Search
CPC .......... G01V 1/184; G01V 1/38; G01V 1/186; G01V 1/189

USPC ...... 73/514.29, 514.33, 653; 367/20, 52, 60, 367/63, 74, 79, 134, 154, 178, 165, 173; 439/320, 475

See application file for complete search history.

(56) References Cited

U.S. PATENT DOCUMENTS

| | | | |
|---|---|---|---|
| 4,319,347 A * | 3/1982 | Savit | 367/52 |
| 5,600,608 A | 2/1997 | Weiss et al. | |
| 5,774,416 A * | 6/1998 | Sadek et al. | 367/24 |
| 6,021,091 A | 2/2000 | Gaiser | |
| 6,827,597 B1 * | 12/2004 | Metzbower et al. | 439/320 |
| 6,853,604 B2 | 2/2005 | Spackman et al. | |
| 7,021,146 B2 | 4/2006 | Nash et al. | |

(Continued)

OTHER PUBLICATIONS

International Search Report issued in Application No. PCT/US2011/001089 with a mailing date of Oct. 26, 2011.

(Continued)

*Primary Examiner* — Daniel L Murphy
(74) *Attorney, Agent, or Firm* — Patent Portfolio Builders PLLC (57) ABSTRACT

A seismic streamer includes a sensor comprises an axially oriented body including a plurality of axially oriented channels arranged in opposing pairs; a plurality of hydrophones arranged in opposing pairs in the channels; a pair of orthogonally oriented acoustic particle motion sensors; and a tilt sensor adjacent or associated with the particle motion sensors. The streamer has a plurality of hydrophones, as previously described, aligned with a plurality of accelerometers which detect movement of the streamer in the horizontal and vertical directions, all coupled with a tilt sensor, so that the marine seismic system can detect whether a detected seismic signal is a reflection from a geologic structure beneath the streamer or a downward traveling reflection from the air/seawater interface.

26 Claims, 5 Drawing Sheets

(56) References Cited

U.S. PATENT DOCUMENTS

| | | |
|---|---|---|
| 7,359,283 B2 | 4/2008 | Vaage et al. |
| 7,382,689 B2 * | 6/2008 | Maples et al. ............... 367/165 |
| 7,623,414 B2 * | 11/2009 | Boergen et al. ............. 367/178 |
| 7,624,637 B2 | 12/2009 | Kurtz et al. |
| 2004/0035634 A1 | 2/2004 | Rueter |
| 2005/0018537 A1 | 1/2005 | Welker et al. |
| 2006/0239117 A1 * | 10/2006 | Singh et al. .................. 367/20 |
| 2007/0036033 A1 | 2/2007 | Maples et al. |
| 2008/0275649 A1 | 11/2008 | Ozdemir et al. |
| 2009/0065289 A1 | 3/2009 | Tenghamn et al. |
| 2010/0039889 A1 | 2/2010 | Teigen et al. |
| 2011/0044128 A1 | 2/2011 | Storteig et al. |

OTHER PUBLICATIONS

Office Action in corresponding Canadian Application No. 2,803,795 dated Mar. 3, 2017.

Extended European Search Report in corresponding European Application No. 11 798 499.7 dated Apr. 13, 2017.

* cited by examiner

DUAL AXIS GEOPHONES FOR PRESSURE/VELOCITY SENSING STREAMERS FORMING A TRIPLE COMPONENT STREAMER

CROSS-REFERENCE TO RELATED APPLICATIONS

This application is a Continuation application which claims priority under 35 U.S.C. 120 to U.S. application Ser. No. 13/493,361, filed on Jun. 11, 2012 which is a Continuation application of U.S. application Ser. No. 13/161,896, filed on Jun. 16, 2011 which claims priority to U.S. Patent Application No. 61/356,835 filed on Jun. 21, 2010, all of which are hereby expressly incorporated by reference into the present application.

FIELD OF THE INVENTION

The present invention relates generally to the field of seismic streamers which are towed through water behind vessels for seismic exploration, and, more particularly, to the field of non-fluid filled seismic streamers. Even more particularly, the present invention relates to a seismic streamer which includes a pair of orthogonal acoustic particle motion sensors, such as geophones or accelerometers, in the same segment or in close proximity to a plurality of pressure sensors, such as hydrophones.

BACKGROUND OF THE INVENTION

The background in related art is described by Vaage et al. in U.S. Pat. No. 7,684,281. In seismic exploration, geophysical data are obtained by applying acoustic energy to the earth from an acoustic source and detecting seismic energy reflected from interfaces between different layers in subsurface formations. The seismic wavefield is reflected when there is a difference in acoustic impedance between the layers on either side of the interface. Typically in marine seismic exploration, a seismic streamer is towed behind an exploration vessel at a water depth normally between about six to about nine meters, but can be towed shallower or deeper. Hydrophones are included in the streamer cable for detecting seismic signals. A hydrophone is a submersible pressure sensor that converts pressure waves into electrical or optical signals that are typically recorded for signal processing, and evaluated to estimate characteristics of the subsurface of the earth.

In a typical geophysical exploration configuration, a plurality of streamer cables are towed behind a vessel. One or more seismic sources are also normally towed behind the vessel. The seismic source, which is often an air gun array, but may also be a water gun array or other type of source known to those of skill in the seismic art, transmits seismic energy or waves into the earth and the waves are reflected back by interfaces in the earth and recorded by sensors in the streamers. Winged hydrodynamic actuators are typically employed to maintain the cables in the desired lateral position while being towed. Alternatively, the seismic cables are maintained at a substantially stationary position in a body of water, either floating at a selected depth or lying on the bottom of the body of water, in which case the source may be towed behind a vessel to generate acoustic energy at varying locations, or the source may also be maintained in a stationary position.

When the reflected wave reaches the streamer cable, the wave is detected by the hydrophones in the streamer cable as the primary signal. The reflected wave also continues to propagate to the water/air interface at the water surface, from which the wave is reflected downwardly, and is again detected by the hydrophones in the streamer cable. The water surface is a good reflector and the reflection coefficient at the water surface is nearly unity in magnitude and is negative in sign for pressure signals. The waves reflected at the surface will thus be phase-shifted 180° relative to the upwardly propagating waves. The downwardly propagating wave recorded by the receivers is commonly referred to as the surface reflection or the "ghost" signal. Because of the surface reflection, the water surface acts like a filter, which creates spectral notches in the recorded signal, making it difficult to record data outside a selected bandwidth. Because of the influence of the surface reflection, some frequencies in the recorded signal are amplified (constructive interference) and some frequencies are attenuated (destructive interference).

Maximum attenuation will occur at frequencies for which the propagation distance between the detecting hydrophone and the water surface is an integer multiple of one-half wavelength. Maximum amplification will occur at frequencies for which the propagation distance between the detecting hydrophone and the water surface is an integer multiple of one-quarter wavelength. The wavelength of the acoustic wave is equal to the velocity divided by the frequency, and the velocity of an acoustic wave in water is about 1500 meters/second. Accordingly, the location in the frequency spectrum of the resulting first (lowest-frequency) spectral notch can be readily determined. For example, for a seismic streamer at a depth of 7 meters, and waves with vertical incidence, maximum attenuation will occur at a frequency of about 107 Hz and maximum amplification will occur at a frequency of about 54 Hz.

It has not been common practice to tow streamer cables deeper than about nine meters because the location of the lowest-frequency spectral notch in the frequency spectrum of the signal detected by a hydrophone substantially diminishes the utility of the recorded data. It has also not been common practice to tow streamer cables at depth less than six meters, because of the significant increase in surface related noise induced in the seismic streamer data.

It is also common to perform marine seismic operations in which sensors are deployed at the water bottom. Such operations are typically referred to as "ocean bottom seismic" operation seismic operations, both pressure sensors (hydrophones) and particle motion sensors (geophones, accelerometers) are deployed at the ocean floor to record seismic data.

A particle motion sensor, such as a geophone, has directional sensitivity, whereas a pressure sensor, such as hydrophone, does not. Accordingly, the upgoing wavefield signals detected by a geophone and hydrophone located close together will be in phase, while the downgoing wavefield signals will be recorded 180° out of phase if the geophone is oriented in a particular direction. Various techniques have been proposed for using this phase difference to reduce the spectral notches caused by the surface reflection and, if the recordings are made on the seafloor, to attenuate water borne multiples. It should be noted that an alternative to having the geophone and hydrophone co-located, is to have sufficient spatial density of sensors so that the respective wavefields recorded by the hydrophone and the geophone can be reconstructed (interpolated) at a convenient location in the vicinity of the spatial distribution of sensors.

U.S. Pat. No. 4,486,865 to Ruehle, for example, teaches a system for suppressing ghost reflections by combining the outputs of pressure and velocity detectors. The detectors are paired, one pressure detector and one velocity detector in each pair. A filter is said to change the frequency content of at least one of the detectors so that the ghost reflections cancel when the outputs are combined.

U.S. Pat. No. 5,621,700 to Moldovenu also teaches using at least one sensor pair comprising a pressure sensor and a velocity sensor in an ocean bottom cable in a method for attenuating ghosts and water layer reverberations.

U.S. Pat. No. 4,935,903 to Sanders et al, teaches a marine seismic reflection prospecting system that detects seismic waves traveling in water by pressure sensor-particle velocity sensor pairs (e.g. hydrophone-geophone pairs) or alternately, vertically-spaced pressure sensors. Instead of filtering to eliminate ghost reflection data, the system calls for enhancing primary reflection data for use in pre-stack processing by adding ghost data.

U.S. Pat. No. 4,979,150 to Barr provides a method for marine seismic prospecting said to attenuate coherent noise resulting from water column reverberation by applying a scale factor to the output of a pressure transducer and a particle velocity transducer positioned substantially adjacent to one another in the water. Barr states that the transducers may be positioned either on the ocean bottom or at a location in the water above the bottom, although the ocean bottom is said to be preferred.

U.S. Pat. No. 7,239,577, to Tenghamn describes a particle motion sensor for use in a streamer cable and a method for equalizing and combining the output signals of the particle motion sensor and a co-located pressure gradient sensor.

As the cited patents show, it is well known in the art that pressure and particle motion signals can be combined to derive both the up-going and the down-going wavefield. For sea floor recordings, the up-going and down-going wavefields may subsequently be combined to remove the effect of the surface reflection and to attenuate water borne multiples in the seismic signal. For towed streamer applications, however, the particle motion signal has been regarded as having limited utility because of the high noise level in the particle motion signal. However, if particle motion signals could be provided for towed streamer acquisition, the effect of the surface reflection could be removed from the data.

U.S. Pat. No. 7,123,543 describes a procedure for attenuating multiples by combining up- and down-going wavefields, measured in the water column, where the wavefields are calculated from combining pressure sensors like hydrophones and motion sensors like geophones. The procedure assumes, however, that both the pressure and the motion data have the same bandwidth.

It has been difficult to achieve the same bandwidth in the motion sensor data as in the pressure sensor data, however, because of the noise induced by vibrations in the streamer, which is sensed by the particle motion sensors. The noise is, however, mainly confined to lower frequencies. One way to reduce the noise is to have several sensors in series or in parallel. This approach, however, does not always reduce the noise enough to yield a signal-to-noise ratio satisfactory for further seismic processing.

A combination of acoustic pressure and particle velocity can in principle be used to discriminate the direction of acoustic wavefront. This technique has a long history in the world of 'velocity' microphones.

In the field of marine geophysics, acoustic particle velocity sensing is often done with geophones (typically electrodynamic velocity sensors). The motion of a neutrally-buoyant cable is taken to be a good analog of the acoustic particle velocity, at least over some frequency range and some angle of incidence range. To minimize cost and complexity some vendors use a single axis gimbaled sensor on the assumption that only vertically-oriented wavefronts are of primary interest.

Historically, vertically oriented wavefronts were in fact the primary concern, but in modern geophysics there is increased interest in wavefronts arriving from a broad range of angles, so the gimbaled single axis sensor is not optimal.

High quality gimbals are not inexpensive, and even the best introduce the possibility of slip ring noise, and it is common practice to add fluid damping so that the geophone sensor orientation may lag the actual cable orientation in the presence of roll. Such a lag would introduce errors in the measured acoustic particle velocity.

In the case of 'solid' cable streamers such as Sercel's Sentinel® streamer, gimbals pose a very difficult problem in that the gimbaled sensor needs to have its center of gravity exactly on the cable center of gravity, yet that space is occupied by stress member and electrical wiring. SENTINEL® is a registered trademark of Sercel, Inc. A pair of orthogonal particle motion sensors with their active axes passing through the cable axis bypass the geometrical problems as well as the potential for lag and slip ring noise while also allowing for the possibility of discrimination of other-than-vertical wavefront arrivals.

For orthogonal particle motion sensors, separate tilt (rotation) sensing means must be provided (e.g. accelerometers with adequate DC accuracy) in order to determine direction based on gravity. A pair of orthogonal high quality DC-responsive accelerometers could serve both for velocity sensing and directional sensing, but the embodiments described herein use less expensive components.

Every sensor poses a cost in terms of data acquisition bandwidth. Obviously the single gimbaled velocity sensor is a lowest-cost approach, but with local signal processing the dual axis particle motion sensor plus tilt sensing can be reduced to an equivalent bandwidth load if the functionality of off-vertical discrimination is sacrificed.

In conclusion, the dual orthogonal sensor approach resolves difficult design problems as well as providing much more valuable information to the geophysicist in the way of velocity components.

Thus, a need exists for a method for obtaining a useful particle motion signal with a satisfactory signal-to-noise ratio at low frequencies. In particular, a need exists for a method to generate a particle motion signal with substantially the same bandwidth as a recorded pressure signal, for particle motion and pressure sensors located in a towed marine seismic streamer. Unfortunately, the proposed solutions thus far described are far too complex and expensive to find wide application in the field, and the complexity of these solutions leads to unacceptably high failure rates in operation. In particular there exists a need for a simple, inexpensive structure to combine pressure and particle motion signals in a marine seismic cable to eliminate or minimize ghosts. The invention disclosed herein is directed to fulfilling that need in the art.

SUMMARY OF THE INVENTION

The present invention addresses these and other shortcomings in the art of marine seismic streamers by providing a plurality of hydrophones and a plurality of pairs of orthogonally oriented geophones in a marine seismic cable. The cable also includes a tilt sensor adjacent or in close proximity to the particle motion sensors to indicate the vertical orientation of the particle motion sensors. The combination of the particle motion sensors and the tilt sensor develops a signal which is a function of the direction of incidence, therefore indicating if a signal has been reflected off the overlying air/water interface, and can thus be filtered from the overall seismic signal.

These and other features, objects, and advantages of the present invention will be readily apparent to those of skill in the art from a review of the following detailed description along with the accompanying drawing figures.

BRIEF DESCRIPTION OF THE DRAWINGS

So that the manner in which the above recited features, advantages and objects of the present invention are attained and can be understood in detail, more particular description of the invention, briefly summarized above, may be had by reference to embodiments thereof which are illustrated in the appended drawings.

DETAILED DESCRIPTION OF A PREFERRED EMBODIMENT

Figure 1:
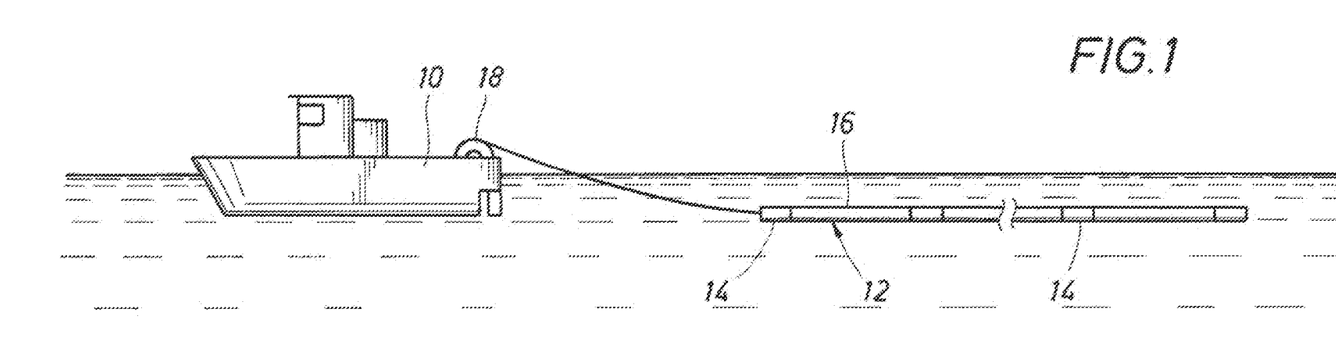
FIG. 1 is an overall schematic of a marine seismic system wherein the present invention may find application.

FIG. 1 depicts a schematic of a basic marine system including a vessel 10 towing a streamer 12. The streamer has a number of pieces of auxiliary equipment, such as depth control devices, associated with it that are not shown in order to simplify FIG. 1.

The streamer 12 also includes a number of hydrophone carriers 14 spaced apart along the streamer. As used herein, the term "hydrophone" refers to the active elements which are sensitive to the seismic signals (acoustic pressure) and the supporting body (or structure) which retains the active elements is referred to as a "hydrophone carrier". Active elements typically comprise piezoelectric elements, but may also include optical elements, micro-machined electro-mechanical sensor elements, and the like. In the present invention, the hydrophone carrier is adapted to retain not only the hydrophones but also a pair of orthogonally oriented geophones and a tilt sensor.

The hydrophone carriers 14 and a buoyant material are sealed within an outer jacket 16, preferably made of polyurethane, to present a smooth profile, thereby minimizing flow noise. During seismic operations, the streamer 12 is deployed from a cable reel 18 and, once operations are complete, the streamer 12 is reeled back onto the cable reel 18.

As one example, a streamer 12 may be comprised of a plurality of sections, each section 150 meters in length. Each section includes twelve hydrophone groups, with eight hydrophones per group. Between each hydrophone group is a particle motion sensor (accelerometer) group, with four accelerometers per group comprising two channels per hydrophone group. This arrangement is shown and described below in greater detail in respect of FIG. 11.

Figure 2:
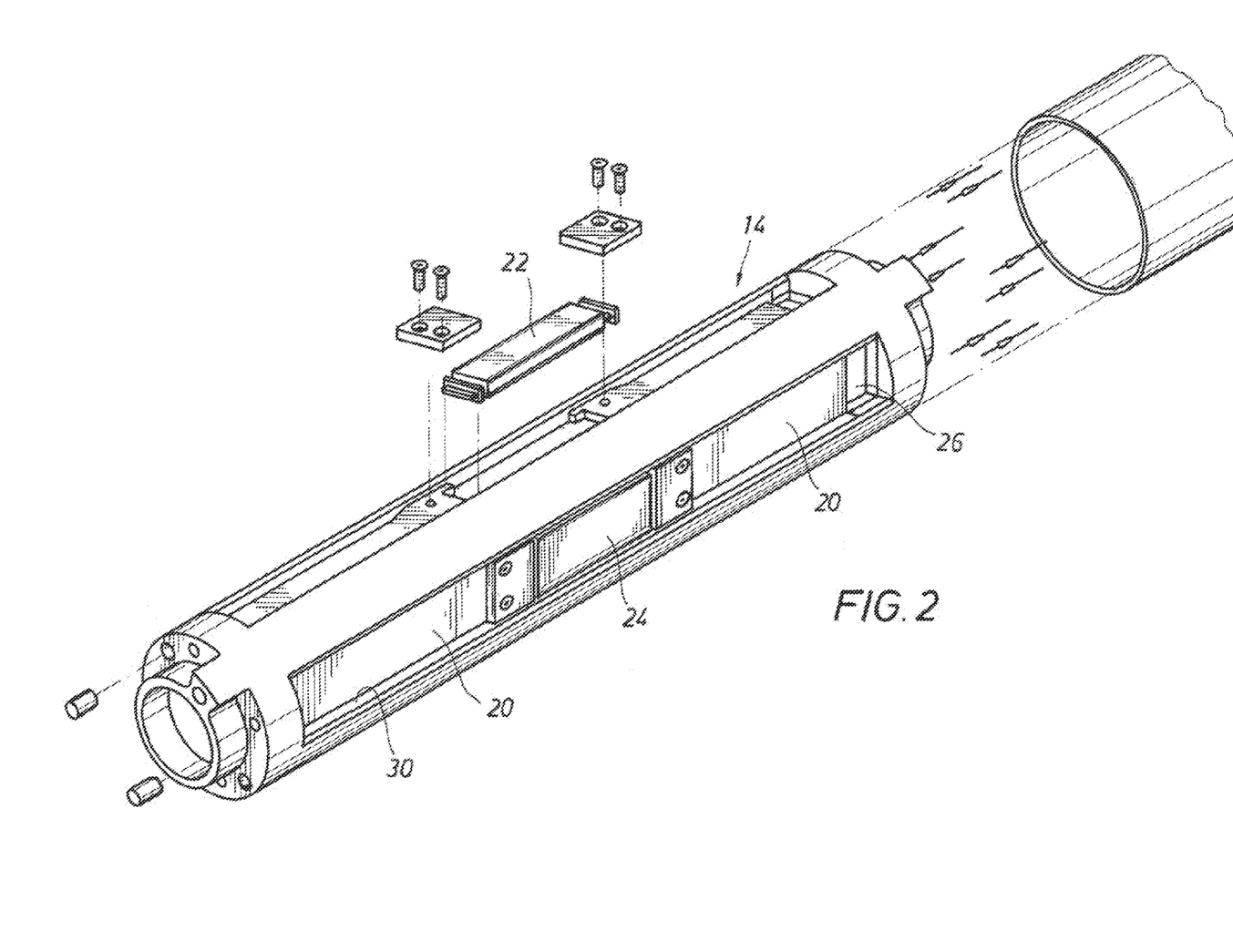
FIG. 2 is a perspective view of a hydrophone carrier, adapted to carry a pair of orthogonally oriented particle motion sensors (specifically accelerometers).

FIG. 2 illustrates a preferred hydrophone carrier 14. The carrier 14 retains a plurality of hydrophones 20, arranged in opposing pairs in opposing wells 30. The carrier 14 also retains a top geophone 22 and a side geophone 24, which are arranged 90° about the cable longitudinal axis relative to one another. The carrier also retains a tilt sensor 26 to determine the angle of tilt of the carrier about its axis, relative to vertical. In a preferred embodiment, four such mutually opposed geophones 24 may be included. Further in a preferred embodiment, the tilt sensor may be deployed in a separate signal processing module, as described below.

Figures 3, 8, 10:
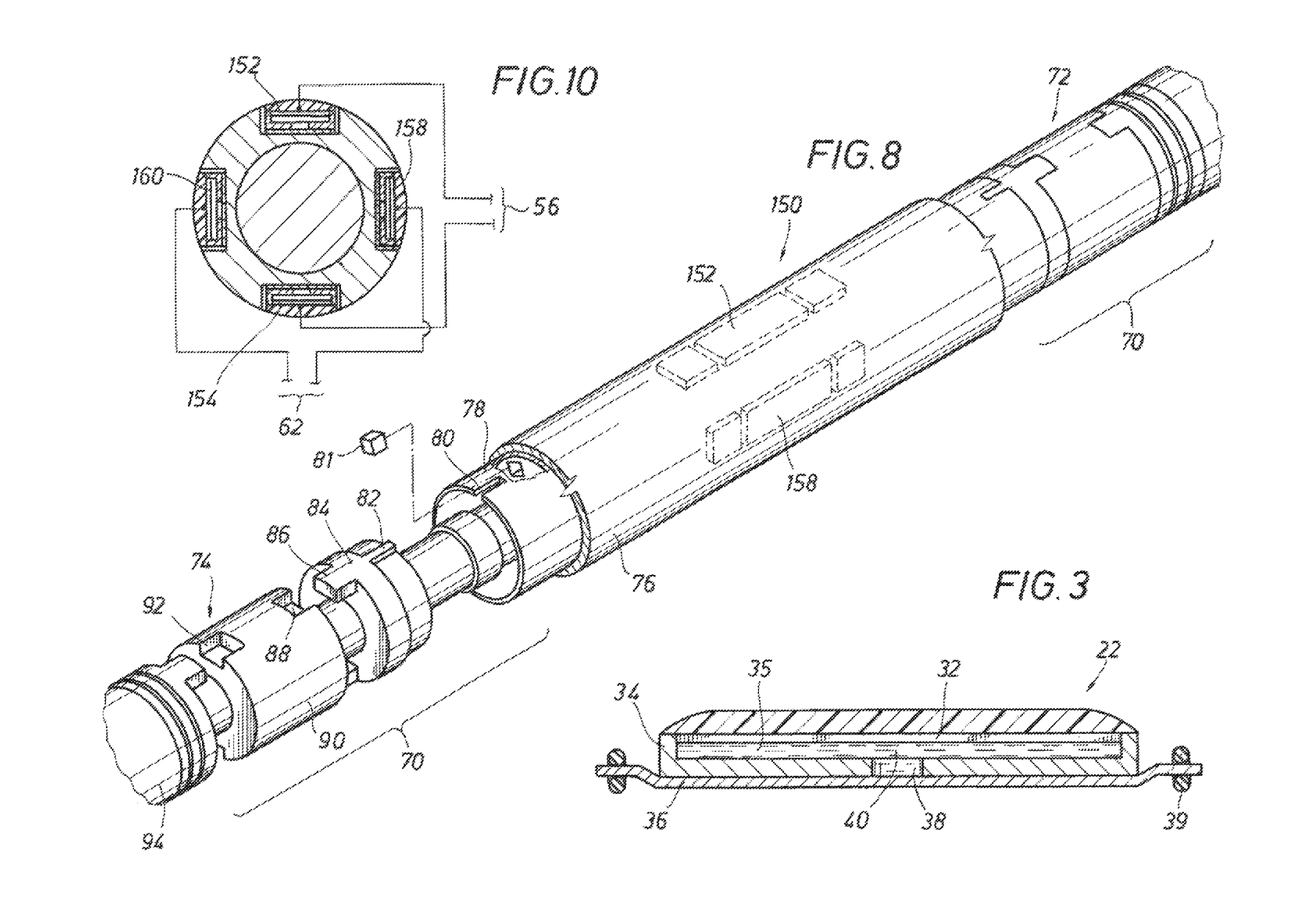
FIG. 3 is a section view of an accelerometer, from which particle velocity can be extracted and which may find application in the present invention.
FIG. 8 is a perspective view of a hydrophone carrier constructed in accordance with the teachings of the present invention.
FIG. 10 is a radial section view of the hydrophone carrier of FIG. 8, taken along the section lines 10-10 of FIG. 9.
Figure 4:
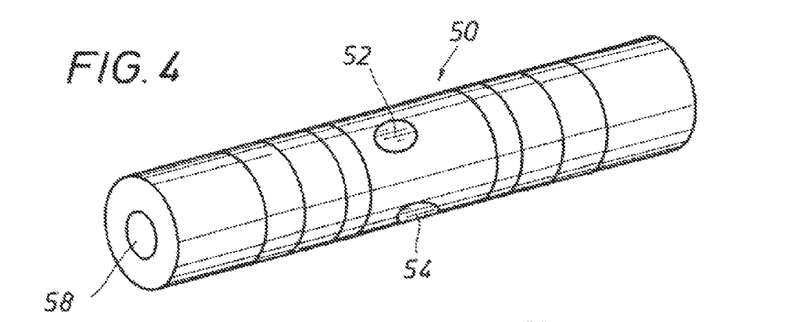
FIG. 4 is perspective view of a particle motion sensor carrier, adapted to carry a pair of orthogonally oriented particle motion sensors and which may or may not include a plurality of hydrophones.
Figure 5:
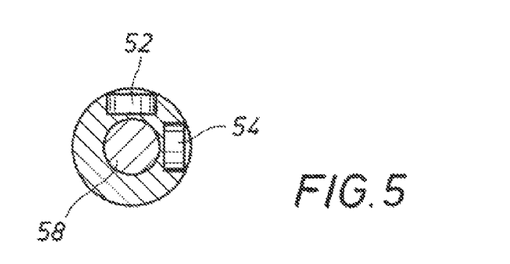
FIG. 5 is a section view of the carrier of FIG. 4.
Figure 6:
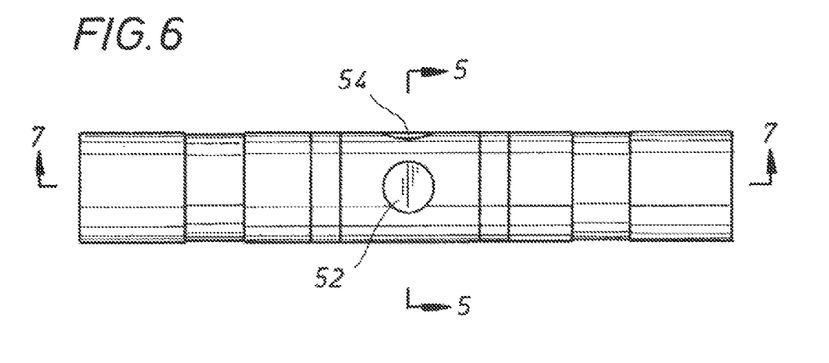
FIG. 6 is a top view of the carrier of FIG. 4.
Figure 7:
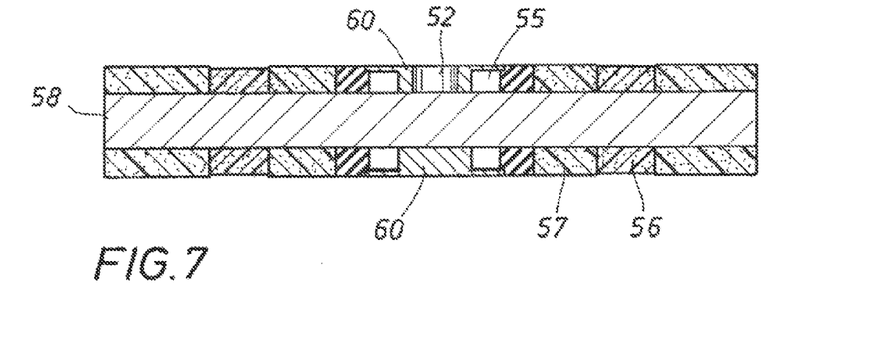
FIG. 7 is side section view of the carrier of FIG. 4.

FIG. 3 illustrates an example of an accelerometer 22 or 24 which may be used in the application of the invention. The accelerometer 22 comprises a piezoelectric element 32 mounted within a box 34 defining an interior chamber 35. The box is secured to a base 36 which includes a hole 38 through it. The hole 38 permits the inflow of fluid, preferably oil, as illustrated by an arrow 40. Without the hole 38, the accelerometer 22 would instead behave as a hydrophone, generating an electrical signal in response to a pressure which would flex the box 34 and thus the element 32. With the hole 38, pressure is equalized across the element 32, and thus the element 32 generates an electrical signal in response to acceleration of the device 22. The accelerometer 22 or 24 is mounted within the hydrophone carrier 14 through pliable grommets 39, preferably made of rubber, in the same manner as shown and described in U.S. Pat. No. 7,382,689, assigned to the same Assignee as the present invention, and incorporated herein by reference. The grommets 39 help to isolate the accelerometer 22 or 24 from vibrations created along the streamer.

FIGS. 4 through 7 illustrate a particle motion sensor carrier 50 of this invention. The carrier 50 include a top geophone 52 and a side geophone 54 and a tilt sensor not shown in this embodiment. The carrier may also include a plurality of hydrophones, arranged in opposing pairs, but these hydrophones are not shown in FIGS. 4 through 7 for simplicity.

The various elements are operatively mounted on a bulk cable 58, which includes strength members, power conductors, signal conductors, and filler material. The geophone 52 is mounted within a molded carrier body 60 which is in turn mounted to cable 58. A void 55 is provided for making wiring connections. In-line vibration damping is provided by element 57, which is adjacent to a molded isolator 56.

Finally, FIGS. 8-11 show an accelerometer section 50 of a presently preferred embodiment of this invention. The invention comprises a streamer having a plurality of hydrophones, as previously described, aligned with a plurality of accelerometers which detect movement of the streamer in the horizontal and vertical directions, all coupled with a tilt sensor, so that the marine seismic system can detect whether a detected seismic signal is a reflection from a geologic structure beneath the streamer or a downward traveling reflection from the air seawater interface.

The accelerometer section 150 includes a top particle motion sensor 152 and a bottom particle motion sensor 154, coupled together by a pair of leads 156 to define a first signal channel. It also includes a right particle motion sensor 158 and a left particle motion sensor 160, coupled together by a pair of leads 162 to define a second signal channel. Each of the particle motion sensors 152, 154, 158, and 160 are preferably constructed as shown in FIG. 3. Thus, rather than a single geophone to detect vertical motion and a single geophone to detect horizontal motion, as shown in FIGS. 2-7, the present preferred embodiment includes pairs of particle motion sensors additively coupled together to enhance signal-to-noise ratio.

As previously described, it is critical for proper operation of this invention that the orientation of the accelerometer section 150 and the adjacent accelerometer sections 150 that comprise the accelerometer group be well known. Thus, the accelerometer section 150 includes a key assembly 70. For purposes of description, the cable includes a forward end 72 and an after end 714. The key assembly 70 at the forward end 72 is shown made up, while the key assembly 70 at the after end 74 is shown in an exploded view.

The streamer is covered by a jacket 76 in a manner well known in the art. In turn, the particle motion sensors 152, 154, 158, and 160 are enclosed within a sleeve 78. A notch 80 is formed in the sleeve to mate with a first key 82 formed in an end cap 84. A magnet 81 is positioned adjacent the first key 82. The magnet is used to find the orientation of the accelerometer after the final skin is extruded over the cable, it is necessary to know the orientation of the accelerometers when calibrating the offset between the tilt meter gravity measurement and the accelerometer orientation. The end cap 84 also includes second key 86 to mate with a first notch 88 formed in a coupling member 90. The coupling member further includes a second notch 92 which is arranged to mate with an adjacent section 94. This adjacent section 94 may be another accelerometer section 50, a hydrophone group, or a field digitizing unit, as described below in respect of FIG. 11.

Figure 9:
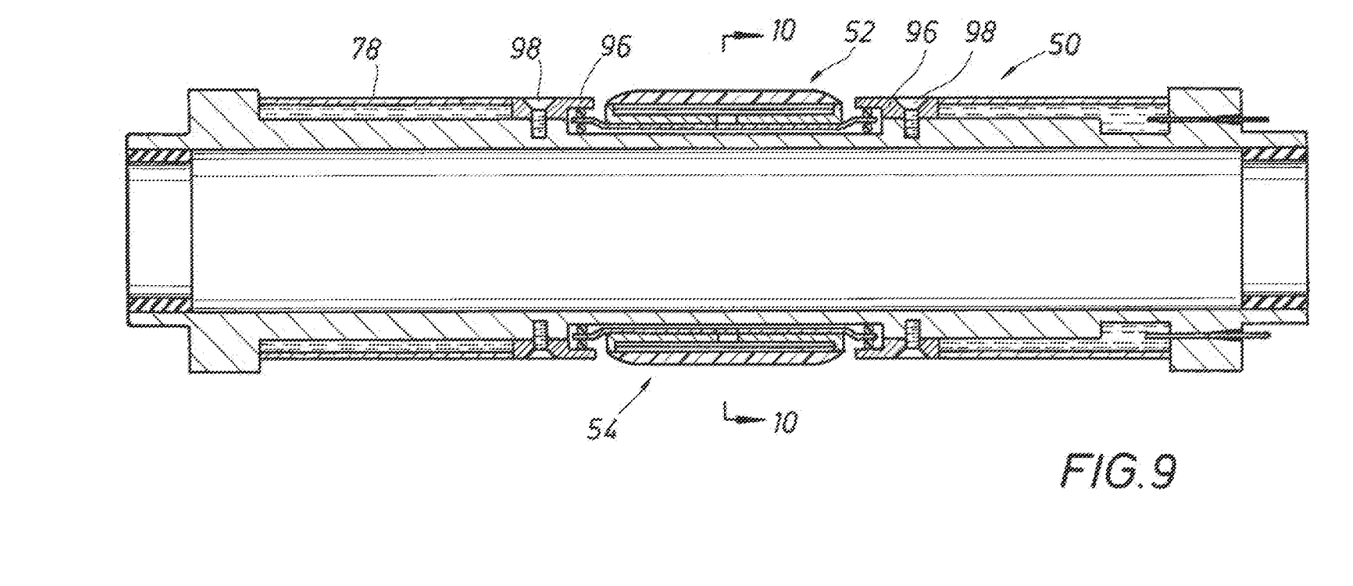
FIG. 9 is a longitudinal section view of the hydrophone carrier of FIG. 8.

The accelerometer section 50 is shown in a side section view in FIG. 9. The top particle motion sensor 52 is mounted to the section 50 with a bracket assembly 96 by, for example, screws 98, or other appropriate means. The sleeve 78 extends from the bracket assembly 96, and the entire section 50 is covered by the jacket 76 (see FIG. 8).

Figure 11:
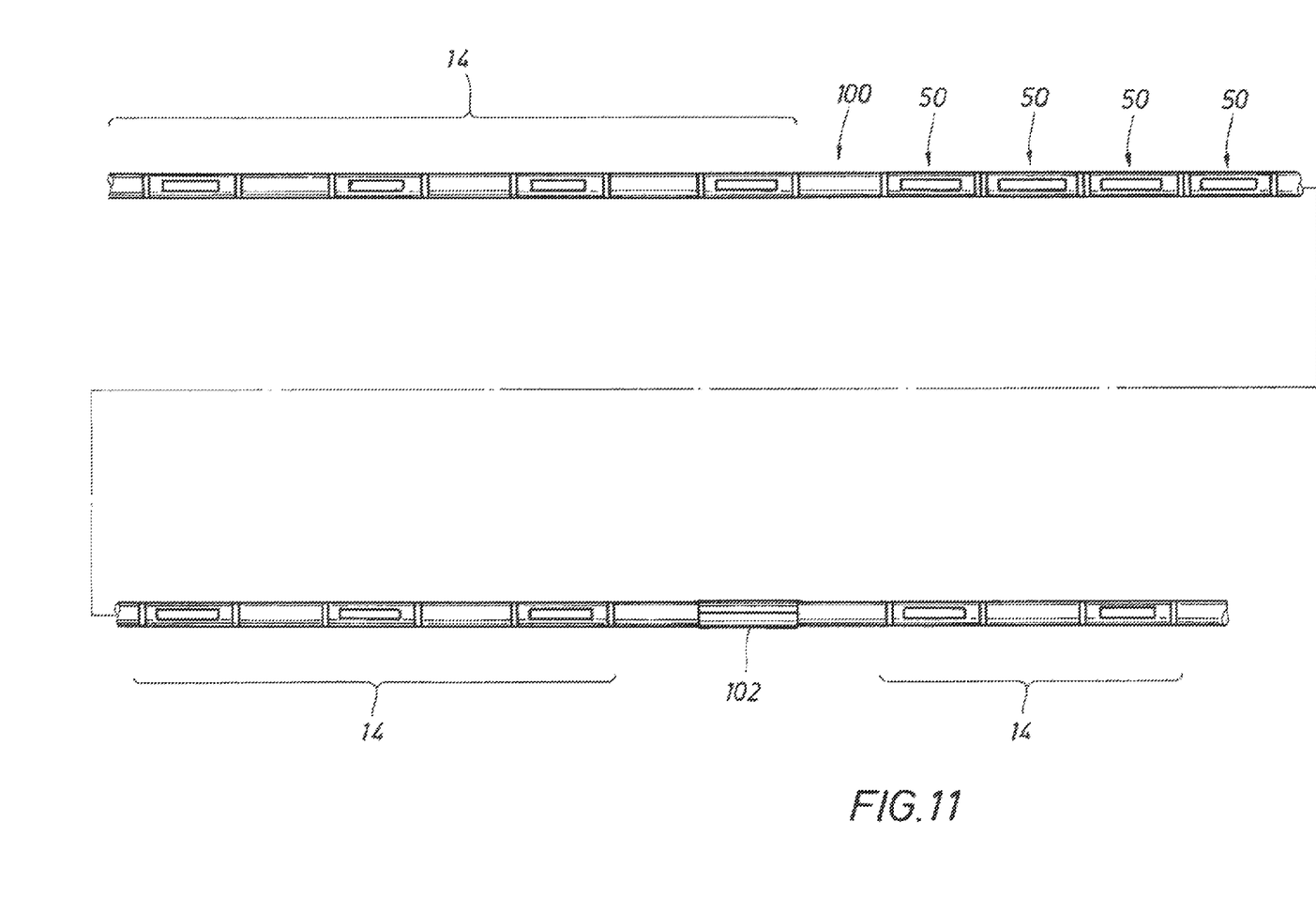
FIG. 11 is a side view of a streamer including a plurality of hydrophones, accelerometers, tilt sensors, and electronics to convert analog seismic signals to digital format for transmission back to a vessel.

Finally, FIG. 11 shows a marine seismic streamer 100 assembled as described herein in accordance with this invention. For descriptive purposes, the left end of the streamer 100 is the forward end of the streamer. The streamer is made up of a plurality of hydrophones carriers 14 associated to a plurality of accelerometer sections 50. Between groups of hydrophones and accelerometer sections is a field digitizing unit 102. The field digitizing unit 102 receives analog seismic signals from the hydrophones carriers 14 and converts these analog signals into digital form. The unit 102 also receives analog signals from the accelerometer sections 50 through leads 56 and 62 and converts these analog signals into digital form. Finally, the unit 102 preferably includes a tilt sensor as previously described in respect of FIG. 2.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

The invention claimed is:

1. A solid streamer for seismic data collection in a marine environment, the solid streamer comprising:
   a bulk cable that provides strength to the solid streamer;
   a hydrophone section distributed along the bulk cable and including plural hydrophones, the plural hydrophones being configured to record seismic waves;
   an accelerometer section distributed along the bulk cable and including plural accelerometers;
   a field digitizing unit located between the hydrophone section and the accelerometer section and configured to receive seismic signals from the plural hydrophones;
   a buoyant solid material distributed around the bulk cable;
   a sleeve enclosing the plural accelerometers; and
   a jacket enclosing the bulk cable, the plural hydrophone, the plural accelerometers, the buoyant material, and the sleeve,
   wherein the buoyant solid material provides flotation to the solid streamer.

2. The solid streamer of claim 1, wherein the plural accelerometers include micro-machined electro-mechanical sensors.

3. The solid streamer of claim 1, wherein the plural hydrophones of the hydrophone section are connected together as a group to enhance a signal-to-noise ratio.

4. The solid streamer of claim 1, further comprising:
   a vibration damping unit to dampen noise introduced by the solid streamer.

5. The solid streamer of claim 1, wherein the plural accelerometers are located in pairs around the bulk cable.

6. The solid streamer of claim 5, wherein accelerometers belonging to a same pair are additively connected to each other.

7. The solid streamer of claim 1, wherein an accelerometer comprises:
   a housing;
   a piezoelectric element mounted inside the housing to form a chamber; and
   oil located in the chamber,
   wherein the chamber fluidly communicates with an exterior of the chamber.

8. The solid streamer of claim 1, further comprising a tilt sensor configured to determine an orientation of the solid streamer.

9. The streamer of claim 8, wherein the tilt sensor is an accelerometer.

10. A method for acquiring seismic data in a marine environment, the method comprising:
    towing a solid streamer with a vessel, wherein the solid streamer includes a bulk cable that provides strength to the solid streamer; a hydrophone section distributed along the bulk cable and including plural hydrophones; an accelerometer section distributed along the bulk cable and including plural accelerometers; a buoyant solid material distributed around the bulk cable; a sleeve enclosing the plural accelerometers; and a jacket enclosing the bulk cable, the plural hydrophones, the plural accelerometers, the buoyant material, and the sleeve, wherein the buoyant solid material provides flotation to the solid streamer; and
    detecting seismic waves with the plural hydrophones and accelerometers,
    wherein an accelerometer comprises:
    a housing, a piezoelectric element mounted inside the housing to form a chamber, and oil located in the chamber, wherein the chamber fluidly communicates with an exterior of the chamber.

11. The method of claim 10, wherein the plural accelerometers include micro-machined electro-mechanical sensors.

12. The method of claim 10, wherein the plural hydrophones of the hydrophone section are connected together as a group to enhance a signal-to-noise ratio.

13. The method of claim 10, wherein a field digitizing unit is located between the hydrophone section and the accelerometer section and is configured to receive seismic signals from the plural hydrophones.

14. The method of claim 10, wherein a vibration damping unit is located on the solid streamer to dampen noise introduced by the solid streamer.

15. The method of claim 10, wherein the plural accelerometers are located in pairs around the bulk cable.

16. The method of claim 15, wherein accelerometers belonging to a same pair are additively connected to each other.

17. The method of claim 10, further comprising:

adding a tilt sensor to the solid streamer to determine an orientation of the solid streamer.

18. The method of claim 17, wherein the tilt sensor is an accelerometer.

19. A solid streamer for seismic data collection in a marine environment, the solid streamer comprising:

a bulk cable that includes power wires, data communication wires, and a strength member that provides strength to the solid streamer;

plural hydrophone sections distributed along the bulk cable, a hydrophone section including plural hydrophones, the plural hydrophones being configured to record seismic waves;

plural accelerometer sections distributed along the bulk cable, an accelerometer section including plural accelerometers, the plural accelerometer sections alternating with the plural hydrophone sections;

field digitizing units, a field digitizing unit being located between corresponding hydrophone and accelerometer sections, the field digitizing unit being configured to receive seismic signals from the plural hydrophones;

a buoyant solid material distributed around the bulk cable; and a jacket enclosing the bulk cable, the plural hydrophones, the plural accelerometers, the buoyant material, and a sleeve that encloses plural accelerometers of an accelerometer section, wherein the buoyant solid material provides flotation to the solid streamer.

20. The solid streamer of claim 19, wherein the plural accelerometers include micro-machined electro-mechanical sensors.

21. The solid streamer of claim 19, wherein the plural hydrophones of a hydrophone section are connected together as a group to enhance a signal-to-noise ratio.

22. The solid streamer of claim 19, further comprising a tilt sensor configured to determine an orientation of the solid streamer.

23. The streamer of claim 22, wherein the tilt sensor is an accelerometer.

24. A solid streamer for seismic data collection in a marine environment, the solid streamer comprising:

a bulk cable that provides strength to the solid streamer;

a hydrophone section distributed along the bulk cable and including plural hydrophones, the plural hydrophones being configured to record seismic waves;

an accelerometer section distributed along the bulk cable and including plural accelerometers;

a buoyant solid material distributed around the bulk cable;

a sleeve enclosing the plural accelerometers; and a jacket enclosing the bulk cable, the plural hydrophone, the plural accelerometers, the buoyant material, and the sleeve, wherein the buoyant solid material provides flotation to the solid streamer, wherein the plural accelerometers are located in pairs around the bulk cable, and wherein accelerometers belonging to a same pair are additively connected to each other.

25. A solid streamer for seismic data collection in a marine environment, the solid streamer comprising:

a bulk cable that provides strength to the solid streamer;

a hydrophone section distributed along the bulk cable and including plural hydrophones, the plural hydrophones being configured to record seismic waves;

an accelerometer section distributed along the bulk cable and including plural accelerometers;

a buoyant solid material distributed around the bulk cable;

a sleeve enclosing the plural accelerometers; and a jacket enclosing the bulk cable, the plural hydrophone, the plural accelerometers, the buoyant material, and the sleeve, wherein the buoyant solid material provides flotation to the solid streamer, and wherein an accelerometer comprises:

a housing, a piezoelectric element mounted inside the housing to form a chamber, and oil located in the chamber, wherein the chamber fluidly communicates with an exterior of the chamber.

26. A method for acquiring seismic data in a marine environment, the method comprising:

towing a solid streamer with a vessel, wherein the solid streamer includes a bulk cable that provides strength to the solid streamer; a hydrophone section distributed along the bulk cable and including plural hydrophones; an accelerometer section distributed along the bulk cable and including plural accelerometers; a buoyant solid material distributed around the bulk cable; a sleeve enclosing the plural accelerometers; and a jacket enclosing the bulk cable, the plural hydrophones, the plural accelerometers, the buoyant material, and the sleeve, wherein the buoyant solid material provides flotation to the solid streamer; and detecting seismic waves with the plural hydrophones and accelerometers, wherein the plural accelerometers are located in pairs around the bulk cable, and wherein accelerometers belonging to a same pair are additively connected to each other.

\* \* \* \* \*